(12) United States Patent
Alibay et al.

(10) Patent No.: US 10,334,168 B2
(45) Date of Patent: *Jun. 25, 2019

(54) THRESHOLD DETERMINATION IN A RANSAC ALGORITHM

(71) Applicant: STMicroelectronics SA, Montrouge (FR)

(72) Inventors: Manu Alibay, Alfortville (FR); Stéphane Auberger, Saint-Maur-des-Fosses (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,043

(22) Filed: Dec. 28, 2018

(65) Prior Publication Data

US 2019/0141247 A1    May 9, 2019

Related U.S. Application Data

(63) Continuation of application No. 15/382,013, filed on Dec. 16, 2016.

(30) Foreign Application Priority Data

Dec. 17, 2015  (FR) ...................................... 15 62591
Nov. 18, 2016  (EP) ..................................... 16199466

(51) Int. Cl.
*H04N 5/232* (2006.01)
*G06T 7/35* (2017.01)
(Continued)

(52) U.S. Cl.
CPC ........... *H04N 5/23254* (2013.01); *G06T 7/33* (2017.01); *G06T 7/35* (2017.01); *H04N 5/145* (2013.01);
(Continued)

(58) Field of Classification Search
None
See application file for complete search history.

(56) References Cited

U.S. PATENT DOCUMENTS

| 9,430,847 B2 | 8/2016 | Ramalingam et al. |
| 2001/0033692 A1 | 10/2001 | Borneo et al. |

(Continued)

FOREIGN PATENT DOCUMENTS

| EP | 3 182 371 A1 | 6/2017 |
| FR | 3 027 144 A1 | 4/2016 |

OTHER PUBLICATIONS

Ababsa et al., "Inertial and Vision Head Tracker Sensor Fusion Using a Particle Filter for Augmented Reality Systems," 2004 International Symposium on Circuits and Systems, Vancouver, BC, Canada, May 23-26, 2004, 4 pages.

(Continued)

*Primary Examiner* — Roberto Velez
*Assistant Examiner* — Tuan H Le
(74) *Attorney, Agent, or Firm* — Seed IP Law Group LLP

(57) ABSTRACT

A method determines a movement of an apparatus between capturing first and second images. The method includes testing model hypotheses of the movement by for example a RANSAC algorithm, operating on a set of first points in the first image and assumed corresponding second points in the second image to deliver the best model hypothesis. The testing includes, for each first point, calculating a corresponding estimated point using the tested model hypothesis, determining the back-projection error between the estimated point and the second point in the second image, and comparing each back projection error with a threshold. The testing comprises for each first point, determining a correction term based on an estimation of the depth of the first point in the first image and an estimation of the movement between the first and second images, and determining the (Continued)

threshold associated with the first point by using said correction term.

16 Claims, 6 Drawing Sheets

(51) Int. Cl.
    *H04N 5/14*         (2006.01)
    *G06T 7/33*         (2017.01)

(52) U.S. Cl.
    CPC ................ *H04N 5/23267* (2013.01); *G06T 2207/20076* (2013.01)

(56) References Cited

U.S. PATENT DOCUMENTS

| | | | |
|---|---|---|---|
| 2005/0094852 | A1 | 5/2005 | Kumar et al. |
| 2005/0105627 | A1 | 5/2005 | Sun et al. |
| 2005/0182518 | A1 | 8/2005 | Karlsson |
| 2008/0137908 | A1 | 6/2008 | Stein et al. |
| 2011/0153206 | A1* | 6/2011 | Kotaba ............ G01C 21/00 701/532 |
| 2011/0169923 | A1 | 7/2011 | Dellaert et al. |
| 2011/0285811 | A1 | 11/2011 | Langlotz et al. |
| 2011/0299735 | A1* | 12/2011 | Anisimovich ........ G06K 9/468 382/103 |
| 2012/0070037 | A1 | 3/2012 | Polle |
| 2012/0121161 | A1 | 5/2012 | Eade et al. |
| 2012/0281922 | A1* | 11/2012 | Yamada ............ H04N 5/23254 382/201 |
| 2013/0080045 | A1 | 3/2013 | Ma et al. |
| 2014/0212027 | A1 | 7/2014 | Hallquist et al. |
| 2014/0355832 | A1* | 12/2014 | Thouy ................ G06K 9/623 382/103 |
| 2015/0099025 | A1 | 4/2015 | Spalt |
| 2015/0142248 | A1 | 5/2015 | Han et al. |
| 2015/0304634 | A1 | 10/2015 | Karvounis |
| 2015/0312719 | A1 | 10/2015 | Cho et al. |
| 2016/0034452 | A1 | 2/2016 | Ramanathan et al. |
| 2017/0177980 | A1 | 6/2017 | Alibay et al. |
| 2017/0178347 | A1 | 6/2017 | Alibay et al. |
| 2017/0178355 | A1 | 6/2017 | Alibay et al. |

OTHER PUBLICATIONS

Alahi et al., "FREAK: Fast Retina Keypoint," *2012 IEEE Conference on Computer Vision and Pattern Recognition (CVPR)*, Providence, Rhode Island, Jun. 16-21, 2012, pp. 510-517.

Alibay et al., "Hybrid Visual and Inertial Ransac for Real-Time Motion Estimation," *2014 IEEE International Conference on Image Processing (ICIP)*, Paris, France, Oct. 27-30, 2014, pp. 179-183.

Alibay, "Extended sensor fusion for embedded video applications," Thesis to obtain a Doctorate in Computer Science and Robotics from the Paris Institute of Technology, Dec. 18, 2015, 138 pages.

Armesto et al., "On multi-rate fusion for non-linear sampled-data systems: Application to a 6D tracking system," *Robotics and Autonomous Systems* 56:706-715, 2008.

Bleser et al., Using Optical Flow for Filling the Gaps in Visual-Inertial Tracking, 18th European Signal Processing Conference, Aalborg, Denmark, Aug. 23-27, 2010, 5 pages.

Calonder et al., "BRIEF: Binary Robust Independent Elementary Features," *11$^{th}$ European Conference on Computer Vision*, Hersonissos, Greece, Sep. 5-11, 2010, 14 pages.

Calonder et al., "BRIEF: Computing a Local Binary Descriptor Very Fast," *IEEE Transactions on Pattern Analysis and Machine Intelligence* 34(7):1281-1298, Jul. 2012.

Civera et al., "1-Point RANSAC for EKF Filtering. Application to Real-Time Structure from Motion and Visual Odometry," *2009 IEEE/RSJ International Conference on Intelligent Robots and Systems (IROS 2009)*, St.Louis, Missouri, Oct. 10-15, 2009, 32 pages.

Comaniciu, "Density Estimation-based Information Fusion for Multiple Motion Computation," *IEEE Proceedings of the Workshop on Motion and Video Computing (Motion '02)*, Orlando, Florida, USA, Dec. 9, 2002, pp. 241-246.

Davison, "MonoSLAM: Real-Time Single Camera SLAM," *IEEE Transactions on Pattern Analysis and Machine Intelligence* 29(6):1052-1067, Jun. 2007.

Davison, "Real-Time Simultaneous Localisation and Mapping with a Single Camera," *Proceedings of the Ninth IEEE International Conference on Computer Vision (ICCV'03)*, Nice, France, Oct. 13-16, 2003, 8 pages.

Dubrofsky, "Homography Estimation," A master's essay submitted in partial fulfillment of the requirements for the degree of Master of Science in The Faculty of Graduate Studies (Computer Science) from The University of British Columbia (Vancouver), 32 pages, Mar. 2009.

Durrie et al., "Vision-Aided Inertial Navigation on an Uncertain Map Using Particle Filter," *2009 IEEE International Conference on Robotics and Automation*, Kobe, Japan, May 12-17, 2009, pp. 4189-4194.

Eade et al., "Edge landmarks in monocular SLAM," *Image and Vision Computing* 27:588-596, 2009.

Fischler et al., "Random Sample Consensus: A Paradigm for Model Fitting with Applications to Image Analysis and Automated Cartography," *Communications of the ACM* 24(6):381-395, Jun. 1981.

Hafez et al., "Particle-filter-based Pose Estimation from Controlled Motion with Application to Visual Servoing," *International Journal of Advanced Robotics Systems* 11(10):177, 2014. (11 pages).

Hartley et al., *Multiple View Geometry in Computer Vision*, Cambridge, UK, Cambridge University Press, 2003, 673 pages.

Hartley, "In Defence of the 8-point Algorithm" *5$^{th}$ IEEE International Conference on Computer Vision*, Cambridge, Massachusetts, Jun. 20-23, 1995, pp. 1064-1070.

Hilsenbeck et al., "Graph-based Data Fusion of Pedometer and WiFi Measurements for Mobile Indoor Positioning," 2014 ACM International Joint Conference on Pervasive and Ubiquitous Computing (UbiComp 2014), Seattle, WA, Sep. 13-17, 12 pages.

Holmes et al., "An $O(N^2)$ Square Root Unscented Kalman Filter for Visual Simultaneous Localization and Mapping," *IEEE Transactions on Pattern Analysis and Machine Intelligence* 31(7):1251-1263, Jul. 2009.

Horn et al., "Determining Optical Flow," *Artificial Intelligence* 17(1-3):185-203, Aug. 1981.

Huster et al., "Relative Position Estimation for Intervention-Capable AUVS by Fusing Vision and Inertial Measurements," 12th International Symposium on Unmanned Untethered Submersible Technology, Durham, New Hampshire, Aug. 2001, 11 pages.

Hwangbo et al., "Inertial-Aided KLT Feature Tracking for a Moving Camera," *2009 IEEE/RSJ International Conference on Intelligent Robots and Systems*, St. Louis, Missouri, Oct. 11-15, 2009, pp. 1909-1916.

Jia et al., "Probabilistic 3-D Motion Estimation for Rolling Shutter Video Rectification from Visual and Inertial Measurements," *14$^{th}$ IEEE International Workshop on Multimedia Signal Processing (MMSP)*, Banff, Canada, Sep. 17-19, 2012, pp. 203-208.

Julier et al., "A New Extension of the Kalman Filter to Nonlinear Systems," *Proceedings of SPIE 3068, Signal Processing, Sensor Fusion, and Target Recognition VI*, Orlando, Florida, Apr. 21, 1997, 12 pages.

Kalman, "A New Approach to Linear Filtering and Prediction Problems," *Journal of Basic Engineering* 82(1):35-45, Mar. 1960.

Karpenko et al., "Digital Video Stabilization and Rolling Shutter Correction using Gyroscopes," *Stanford Tech Report CTSR Mar. 2011*, 7 pages.

Klein et al., "Parallel Tracking and Mapping for Small AR Workspaces," *6$^{th}$ IEEE and ACM International Symposium on Mixed and Augmented Reality*, Nara, Japan, Nov. 13-16, 2007, 10 pages.

Klingbeil et al., "A Wireless Sensor Network for Real-time Indoor Localization and Motion Monitoring," 2008 International Conference on Information Processing in Sensor Networks, St. Louis, MO, Apr. 22-24, 2008, 12 pages.

(56) References Cited

OTHER PUBLICATIONS

Kneip et al., "Robust Real-Time Visual Odometry with a Single Camera and an IMU," The 22$^{nd}$ British Machine Vision Conference, Dundee, Scotland, Aug. 29-Sep. 2, 2011, 11 pages.
Kurz et al., "Gravity-Aware Handheld Augmented Reality," *IEEE International Symposium on Mixed and Augmented Reality 2011*, Basel, Switzerland, Oct. 26-29, 2011, pp. 111-120.
Kurz et al., "Handheld Augmented Reality involving gravity measurements," *Computers & Graphics* 36:866-883, 2012.
Kurz et al., "Inertial sensor-aligned visual feature descriptors," 2011 IEEE Conference on Computer Vision and Pattern Recognition (CVPR), Colorado Springs, CO, Jun. 20-25, 2011, 6 pages.
Leizea et al., "Real time non-rigid 3D surface tracking using particle filter," *Computer Vision and Image Understanding* 133:51-65, 2015.
Lepetit et al., "EP$n$P: An Accurate O($n$) Solution to the P$n$P Problem," *International Journal of Computer Vision* 81(2):155-166, 2009.
Leutenegger et al., "BRISK: Binary Robust Invariant Scalable Keypoints," *2011 IEEE International Conference on Computer Vision*, Barcelona, Spain, Nov. 6-13, 2011, 8 pages.
Levi, "Adding rotation invariance to the BRIEF descriptor," *Gil's CV blog*, Jan. 2, 2015, retrieved from https://gilscvblog.com/2015/01/02/adding-rotation-invariance-to-the-brief-descriptor/ on Apr. 25, 2017, 20 pages.
Li et al., "A Reliable and Accurate Indoor Localization Method Using Phone Inertial Sensors," 14th ACM International Conference on Ubiquitous Computing, Pittsburgh, Pennsylvania, Sep. 5-8, 2012, 10 pages.
Liang et al., "Reduced-Complexity Data Acquisition System for Image-Based Localization in Indoor Environments," 2013 International Conference on Indoor Positioning and Indoor Navigation, Montbéliard-Belfort, France, Oct. 28-31, 2013, 9 pages.
Lim et al., "Real-Time 6-DOF Monocular Visual SLAM in a Large-Scale Environment," 2014 IEEE International Conference on Robotics & Automation (ICRA), Hong Kong, China, May 31-Jun. 7, 2014, 8 pages.
Liu et al., "Sequential Monte Carlo Methods for Dynamic Systems," *Journal of the American Statistical Association* 93(443):1032-1044, Sep. 1998.
Lobo et al., "Vision and Inertial Sensor Cooperation Using Gravity as a Vertical Reference," *IEEE Transactions on Pattern Analysis and Machine Intelligence* 25(12):1597-1608, Dec. 2003.
Lowe, "Distinctive Image Feature from Scale-Invariant Keypoints," *International Journal of Computer Vision* 60(2):91-110, Nov. 2004.
Merzban et al., "Toward Multi-Stage Decoupled Visual SLAM System," 2013 IEEE International Symposium on Robotic and Sensors Environments (ROSE), Washington, DC, Oct. 21-23, 2013, 6 pages.
Montemerlo et al., "FastSLAM: A Factored Solution to the Simultaneous Localization and Mapping Problem," *Proceedings of the 18$^{th}$ National Conference on Artificial Intelligence*, Edmonton, Canada, Jul. 28-Aug. 1, 2002, 6 pages.
Moulon et al., "Adaptive Structure from Motion with *a Contrario* Model Estimation," in *Lecture Notes in Computer Science 7727— Asian Conference on Computer Vision 2012 Part IV*, Lee et al. (eds.), Springer-Verlag Berlin Heidelberg, 2013, pp. 257-270.
Mourikis et al., "A Multi-State Constraint Kalamn Filter for Vision-aided Inertial Navigation," *2007 IEEE International Conference on Robotics and Automation*, Rome, Italy, Apr. 10-14, 2007, 8 pages.
Murray et al., *A Mathematical Introduction to Robotic Manipulation*, CRC Press, 1994, 474 pages.
Nistér, "An Efficient Solution to the Five-Point Relative Pose Problem," *IEEE Transactions on Pattern Analysis and Machine Intelligence* 26(6):756-770, Apr. 2004.
Nistér, "Preemptive RANSAC for Live Structure and Motion Estimation," *Proceedings of the 9$^{th}$ IEEE International Conference on Computer Vision*, 2003, pp. 199-206.
Oka et al., "Head Pose Estimation System Based on Particle Filtering with Adaptive Diffusion Control," *MVA—IAPR Conference on Machine Vision Applications*, Tsukuba Science City, Japan, May 16-18, 2005, pp. 586-589.
Rosten et al., "Faster and Better: A Machine Learning Approach to Corner Detection," *IEEE Transactions on Pattern Analysis and Machine Intelligence* 32(1):105-199, Jan. 2010.
Rosten et al., "Machine learning for high-speed corner detection," *9$^{th}$ European Conference on Computer Vision*, Graz, Austria, May 7-13, 2006, 14 pages.
Rublee et al., "ORB: an efficient alternative to SIFT or SURF," *2011 IEEE International Conference on Computer Vision*, Barcelona, Spain, Nov. 6-13, 2011, 8 pages.
Scaramuzza et al., "Tutorial: Visual Odometry Part I: The First 30 Years and Fundamentals," *IEEE Robotics & Automation Magazine* 18(4):80-92, Dec. 2011.
Shoemake, "Animating Rotation with Quaternion Curves," *ACM SIGGRAPH Computer Graphics* 19(3):245-254, Jul. 1985.
Strasdat et al., "Real-time Monocular SLAM: Why Filter?," *2010 IEEE International Conference on Robotics and Automation*, Anchorage, Alaska, May 3-8, 2010, pp. 2657-2644.
Tanaka et al., "Incremental RANSAC for Online Relocation in Large Dynamic Environments," 2006 IEEE International Conference on Robotics and Automation, Orlando, FL, May 15-19, 2006, 8 pages.
Trawny et al., "Vision-Aided Inertial Navigation for Pin-Point Landing using Observations of Mapped Landmarks," *Journal of Field Robotics* 24(5):357-378, 2007.
Triggs et al., "Bundle Adjustment—A Modern Synthesis," *Vision Algorithms: Theory and Practice* 1883:298-372, 2000.
Vernaza et al., "Rao-Blackwellized Particle Filtering for 6-DOF Estimation of Attitude and Position via GPS and Inertial Sensors," 2006 IEEE International Conference on Robotics and Automation, Orlando, Florida, May 15-19, 2006, 8 pages.
Voigt et al., "Robust Embedded Egomotion Estimation," 2011 IEEE/RSJ International Conference on Intelligent Robots and Systems, San Francisco, CA, Sep. 25-30, 2011, 6 pages.
You et al., "Fusion of Vision and Gyro Tracking for Robust Augmented Reality Registration," *Proceedings of the IEEE Virtual Reality 2001 Conference*, Yokohama, Japan, Mar. 13-17, 2001, 8 pages.
You et al., "Hybrid Inertial and Vision Tracking for Augmented Reality Registration," *Proceedings of the IEEE Virtual Reality 1999 Conference*, Houston, Texas, Mar. 13-17, 1999, 8 pages.
You et al., "Orientation Tracking for Outdoor Augmented Reality Registration," *IEEE Computer Graphics and Applications* 19(6):36-42, Nov./Dec. 1999.
Zhang, "A Flexible New Technique for Camera Calibration," *IEEE Transactions on Pattern Analysis and Machine Intelligence* 22(11):1330-1334, Nov. 2000.
U.S. Appl. No. 15/381,928, filed Dec. 16, 2016, Method, Device and Apparatus to Estimate an Ego-Motion of a Video Apparatus in a Slam Type Algorithm.
U.S. Appl. No. 15/382,164, filed Dec. 16, 2016, Dynamic Particle Filter Parameterization.
U.S. Appl. No. 15/381,919, filed Dec. 16, 2016, Method and Device for Generating Binary Descriptors in Video Frames.

\* cited by examiner

Frame coordinates

World coordinates

THRESHOLD DETERMINATION IN A RANSAC ALGORITHM

BACKGROUND

Technical Field

Implementations and embodiments of the disclosure relate to determining movement of an image sensor or apparatus (e.g., a video camera) between successive video images (frames) captured by said image sensor, such as one incorporated in a platform as for example a digital tablet or a mobile cellular telephone, for example, in particular the determination of threshold to be compared with back-projection error in for example a RANSAC type algorithm.

Description of the Related Art

Video image sequences can present numerous quality problems. In particular, when the video image sequences are processed by embedded processors, such as those within digital tablets or mobile cellular telephones, quality problems typically arise.

These quality problems include the presence of fuzzy content, unstable content, or distortions due to the rolling shutter effect. The rolling shutter effect induces a distortion in images acquired during a camera movement due to the fact that the acquisition of an image via a CMOS sensor is performed sequentially line-by-line and not all at once.

All these problems are due to movement between successive images. The global movement between two successive video images may be estimated via a homography model, typically a 3×3 homography matrix modelling a global movement plane. Typically, homography matrices are estimated between successive images using feature matching between these images. Algorithms for estimating such matrices between successive images are well known to the person skilled in the art and for all useful purposes the latter may refer to the essay entitled "Homography Estimation," by Elan Dubrofsky, B.Sc., Carleton University, 2007, THE UNIVERSITY OF BRITISH COLUMBIA (Vancouver), March 2009.

The RANSAC (abbreviation of Random Sample Consensus) algorithm is well known to the person skilled in the art and is notably described in the article by Fischler et al., entitled "Random Sample Consensus: A Paradigm for Model Fitting with Applications to Image Analysis and Automated Cartography," Communications of the ACM, June 1981, Volume 24, No. 6. The RANSAC algorithm is a robust parameter estimation algorithm used notably in image processing applications. It is used for estimating the global movement between two images by testing a number of homography models.

More precisely, in a first step, a generally minimal set of points in the current image, e.g., a triplet of points, is selected randomly from among all the points (pixels) available in a current image. The assumed corresponding triplet of points in the next image is extracted and from these two triplets a homography matrix representing a movement model hypothesis is estimated.

This model hypothesis thus obtained is then tested on the complete set of image points. More precisely, for at least some of the image points, an estimated point is calculated using the tested model hypothesis. The back-projection error between this estimated point and the assumed corresponding point in the next image is determined.

Points not following the model, i.e., of which the back-projection error is greater than a threshold T, are called outliers. Conversely, the nearby points of the model hypothesis are called inliers and form part of the consensus set. The number thereof is representative of the quality of the estimated model hypothesis.

The preceding two steps (choice of a model hypothesis and test on the set of the points) are repeated until the number of iterations reaches a threshold defined by a formula taking into account the desired percentage of inliers and a desired confidence value. When this condition is true, the model hypothesis that led to this condition is then considered as being the model of the global movement between the two images.

However, the calculation time of the RANSAC type algorithm is very variable and depends notably on the number of points tested and the quality of the points. Indeed, in an easy image, notably displaying numerous feature interest points in the image, the assumed corresponding points will easily be found in the next image. But this will not be the case in a difficult image. This variability in calculation time is generally not compatible with the use of such an algorithm in processors embedded in mobile cellular telephones or digital tablets, for example.

Consequently, in such embedded applications a Preemptive RANSAC type algorithm is preferably used, which is well known to the person skilled in the art. The Preemptive RANSAC type algorithm is described, for example, in the article by David Nistér, titled "Preemptive RANSAC for Live Structure and Motion Estimation," Proceedings of the Ninth IEEE International Conference on Computer Vision (ICCV 2003) 2-Volume Set.

In the Preemptive RANSAC algorithm, a set of K homography models, constituting a K model hypotheses to be tested, is first defined from a set of points in the current image (called a hypothesis generator points set) and their matches in the previous image. Typically, K may be between 300 and 500.

Then, all these models are tested, in a similar way to that performed in the conventional RANSAC algorithm, on a first block of image points, e.g., 20 points. At the conclusion of this test, only a portion of the model hypotheses tested is kept, typically those which have achieved the highest scores.

For example, a dichotomy may be performed, i.e., keeping only half of the model hypotheses tested. Then, the remaining model hypotheses are tested using another block of points, and here again, for example, only half of the model hypotheses tested that have obtained the highest scores are kept.

These operations are repeated until all the points are exhausted or a single model hypothesis is finally obtained. In the latter case, this single remaining model hypothesis forms the global model of movement between the two images. In the case where there remain several model hypotheses but more points to be tested, the hypothesis adopted is that with the best score.

However, although the Preemptive RANSAC algorithm has certain advantages notably in terms of calculation time, which makes it particularly well suited for embedded applications, and also for parallel processing, movement estimation is less flexible and sometimes not really suitable for extreme cases. Thus, for example, if a person or an object moves in an image field, it may happen that the movement estimator is focused on the person, producing a result that does not match the movement of the camera, which could, for example, provide incorrect video stabilization.

An improvement has been disclosed in U.S. Patent Publication No. 2016/0105590, incorporated by reference in its entirety, enabling the quality of the image sequence to be improved, and in particular, in certain specific situations. Such an improvement is called Hybrid Ransac and uses information originating from at least one inertial sensor, e.g., at least one gyroscope, in combination with the visual information for improving the estimation of the movement between two successive images.

When estimating the movement of the apparatus, for example 3D rotation, a 3D change in position can be seen as noise.

In RANSAC type algorithm, the noise is modeled the same way for each point (the threshold is the same for each point).

However the noise is non-uniform in the whole image reducing thus the precision in the motion estimation.

BRIEF SUMMARY

According to an embodiment it is thus proposed to take into account this non-uniform noise.

According to an embodiment an adaptation of the threshold is proposed, therefore achieving a superior resilience to the non-uniform noise.

According to one aspect of the disclosure, a method is provided for determining a movement of an apparatus between each current pair of first and second successive video images captured by said apparatus (the first and second successive video images of a pair may be typically the previous image and the current image), said method including a phase of testing a plurality of model hypotheses of said movement by a deterministic algorithm, for example a RANSAC type algorithm (either a conventional or a preemptive or an hybrid RANSAC), operating on a set of first points in the first image and first assumed corresponding points in the second image so as to deliver the best model hypothesis (the best model hypothesis defines the movement).

Said set of first points may include all the image points or preferably only some of those points, for example keypoints (or points of interest).

Said phase of testing comprises for each first point, calculating a corresponding estimated point using the tested model hypothesis, determining the back-projection error between said estimated point and the assumed corresponding point in the second image, and comparing each back projection error with a threshold.

Points not following the model, i.e., of which the back-projection error is greater than a threshold, are called outliers.

According to a general feature of this aspect said phase of testing comprises for each first point of the first image, determining a correction term taking into account an estimation of the depth of said first point in said first image and an estimation of a spatial movement of the apparatus between the first and the second images, and determining the threshold associated with said first point by using said correction term.

The depth may be estimated or obtained for example by a depth sensor included in the apparatus or by a 3D cartography of the image obtained for example by a SLAM type algorithm.

The estimation of the spatial movement between the two images used in the correction term determination may be obtained by a RANSAC type algorithm, or preferably by a filter, for example a particle filter, in particular when the movement is a translational movement.

Although said movement of the apparatus between the two images estimated for example by said RANSAC type algorithm may be any movement, in particular a movement in a plane, said movement is advantageously here an eventual orientation modification of said apparatus between the first image and the second image (i.e., an eventual 3D rotation of said apparatus between the first image and the second image) while said spatial movement between the two images used in the threshold correction term and preferably obtained by a particle filter, comprises advantageously a translational movement of the apparatus between the two images.

Each model hypothesis may thus comprise Euler angles.

Each model hypothesis is for example obtained from motion vectors.

The threshold associated with a first point is for example the sum of a fixed threshold and said corresponding correction term.

According to another aspect of the disclosure, a device is proposed for determining a movement of an apparatus between each current pair of first and second successive video images captured by said apparatus, said device including testing means configured to perform a phase of testing a plurality of model hypotheses of said movement by a deterministic algorithm, for example a RANSAC type algorithm, operating on a set of first points in the first image and first assumed corresponding points in the second image so as to deliver the best model hypothesis, said testing means comprising processing means configured for each first point, to calculate a corresponding estimated point using the tested model hypothesis, to determine the back-projection error between said estimated point and the assumed corresponding point in the second image, and to compare each back projection error with a threshold, characterized in that said processing means comprises calculation means configured for each first point of the first image, to determine a correction term taking into account the depth of said first point in said first image and the spatial movement of the apparatus between the first and the second images, and to determine the threshold associated with said first point by using said correction term.

According to an embodiment said movement is an eventual orientation modification of said apparatus between the first image and the second image.

According to an embodiment each model hypothesis comprises Euler angles.

According to an embodiment each model hypothesis is obtained from motion vectors.

According to an embodiment said spatial movement between the two images taken into account in the correction term comprises a translational movement of the apparatus between the two images.

According to an embodiment the threshold associated with a first point is the sum of a fixed threshold and said correction term.

According to another aspect a platform, for example a smartphone or a tablet, is proposed comprising a device as defined above.

BRIEF DESCRIPTION OF THE SEVERAL VIEWS OF THE DRAWINGS

Other advantages and features of the disclosure will appear in the detailed description below and in the appended drawings which are no limitative, in which.

DETAILED DESCRIPTION

For motion estimation of an apparatus, such as a camera, a problem that arises is to adopt proper motion model representation. This will impact heavily some algorithmic and implementation choices and limitations.

A pinhole projective model is the classical model used for embedded video applications.

In two dimensions, the problematic revolves around restrictions to the planar motion, going from a pure translation to perspective models, and even some more specific ones.

In 3D the main concern is the type of rotation representations that can lead to singularities, difficulties in interpretation, and filtering problems.

The pinhole camera model describes the mathematical relationship between a 3D object viewed by the camera and its 2D projection on the image.

It possesses many limitations: it does not take into account the focus of the camera which creates blur and it does not directly model the discretization that occurs when translating projected image into pixels. In addition, Image distortions due to lenses are not considered.

However, this model is considered as a sufficient geometric approximation for many applications. The real final image plane presents a 180° rotation due to image rays crossing at the pinhole location.

Figure 1:
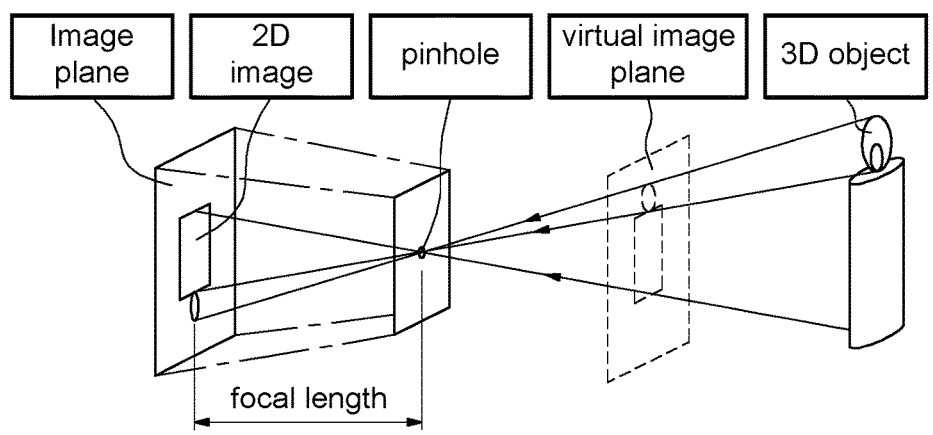
FIG. 1 illustrates a pinhole camera model

As one can see on FIG. 1, the real final image plane presents a 180° rotation due to image rays crossing at the pinhole location. To simplify computation, a virtual image plane is often considered in front of the pinhole. All equations presented in this disclosure will be based on this virtual image, which will now directly be referred to as the image to clarify and lighten the subject.

Figure 2:
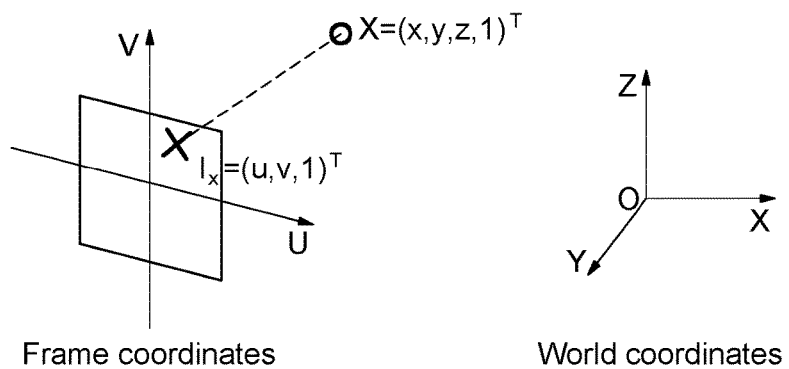
FIG. 2 illustrates coordinates notation.

We now consider a point X in 3D world homogenous coordinates: $X=(x,y,z,1)^T$. The quantities x, y and z represent the world coordinates of the point. The image projection of the point X is noted $I_x$ with its 2D pixel coordinates $I_x=(u, v,1)^T$, u and v being the horizontal and vertical pixel coordinates respectively. A scheme of this representation is displayed on FIG. 2.

The pinhole camera model describes the relationship between X and $I_x$.

This is made in two steps.

The first step explicitly models the geometric position and orientation of the camera with respect to world coordinates. This information is contained in a 3×4 projection matrix P=[R|t], where R is a 3×3 rotation matrix that encodes the orientation of the camera, and t a column vector of 3 elements, representing the position of the pinhole center of the camera.

The second step explicits the transformation of the projection into pixel points. This is modeled by a camera matrix K. In some studies, K is named the instrinsic matrix.

$$K = \begin{pmatrix} f & 0 & c_x \\ 0 & f & c_y \\ 0 & 0 & 1 \end{pmatrix}$$

Where $f$ is the focal length of the camera, and $(c_x, c_y)^T$ the principal point of the camera, that defines the projection of the camera principal rays into the image's plane.

Note that a square pixel is considered here, otherwise it is needed to define two distinct focal lengths for the horizontal and vertical axis of the camera. The complete relationship between pixel location $I_x$ and 3D coordinates X is thus:
$I_x$=KPX While one may consider on-the-fly computation of both K and P matrices, the camera matrix can be computed once in a calibration process and then is considered fixed. The method disclosed in Zhang, Z., 2000, *A flexible new technique for camera calibration. IEEE Transactions on Pattern Analysis and Machine Intelligence,* 22(11), pp. 1330-1334, can be used for example in order to compute the intrinsic camera matrix K.

A 2D transformation between two frames can be expressed in many different manners. To keep the notation homogenous and simple, the transformation using the coordinates changes of a point is represented. A 2D homogenous point $I_x=(u, v, 1)^T$ in the first frame (for example the previous frame) is mapped to a point $I'_x=(u', p', 1)^T$ in the second frame (for example the current frame) by the transformation.

The first type of motion that can be modeled is a direct translation $T=(T_x, T_y)$. It is has a very simple effect on the coordinates:

$$I'_x = \begin{pmatrix} u' \\ v' \\ 1 \end{pmatrix} = \begin{pmatrix} u + T_x \\ v + T_y \\ 1 \end{pmatrix}$$

The main characteristic of this motion model is that it only has 2 degrees of freedom. Therefore it is computable from only one point correspondence from a local motion estimation technique or a global one such as integral projections.

The limitation in terms of motion is very restrictive, and makes it only usable for very closely recorded frames, for example for video encoding, where every block's motion is estimated with a local translational motion model. This type of model can also be used in panorama and stabilization, if in-plane rotation is not considered.

Another type of 2D motion model is the rotation-preserving isometry, which correspond to an in-plane rotation by an angle θ combined with a translation:

$$I'_x = \begin{pmatrix} u' \\ v' \\ 1 \end{pmatrix} = \begin{pmatrix} \cos(\theta) & -\sin(\theta) & T_x \\ \sin(\theta) & \cos(\theta) & T_y \\ 0 & 0 & 1 \end{pmatrix} \begin{pmatrix} u \\ v \\ 1 \end{pmatrix}$$

Only one degree of freedom is added to the translation model, but has a point correspondence provides two pieces of data, two point correspondences are needed to compute the isometry. This motion model is widely used for video stabilization, providing translational and rotational movement estimation that can be filtered. It is also sometimes used in tracking applications, when the size of the object on the image is not expected to change during the sequence.

For non-subsequent image motion estimation, scale changes need to be added to the motion model. This type of model is called a similarity transformation, with a scale change of Z:

$$I'_x = \begin{pmatrix} u' \\ v' \\ 1 \end{pmatrix} = \begin{pmatrix} Z\cos(\theta) & -Z\sin(\theta) & T_x \\ Z\sin(\theta) & Z\cos(\theta) & T_y \\ 0 & 0 & 1 \end{pmatrix} \begin{pmatrix} u \\ v \\ 1 \end{pmatrix}$$

The augmentation of the model with scale opens up many application domains: long term tracking, recognition, etc. . . .

Certain types of motions can lead to a deformation in the shape of the image. To include some simple transformations such as stretching or skewing it is needed to increase the number of parameter in the model:

$$I'_x = \begin{pmatrix} u' \\ v' \\ 1 \end{pmatrix} = \begin{pmatrix} a_{11} & a_{12} & T_x \\ a_{21} & a_{22} & T_y \\ 0 & 0 & 1 \end{pmatrix} \begin{pmatrix} u \\ v \\ 1 \end{pmatrix}$$

This type of representation is an affine transformation. For instance this model is mapped to deduce specific deformations, created by motions recorded with a rolling shutter sensor. The extension to affine model was needed as these distortions do not preserve the shape of the image. As the degree of freedom is increased to 6, three points correspondences are needed to create this type of representation.

The last extension of this type of representation presented here is the projective transformation. The form of the transformation is the following:

$$I'_x = \begin{pmatrix} u' \\ v' \\ w' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} u \\ v \\ 1 \end{pmatrix}$$

Note that the third coordinate is modified in the final image point $I'_x$, to retrieve the final location of the point on the image, one should divide the coordinates of the point by $w'$. This model is needed when modeling "out-of-plane" transformations, for instance 3D rotations. It is useful in applications requiring the tracking of a planar structure moving freely in a scene.

3D motion representation is a complex subject. Many types of model exist, but only the most applied in the context of general motion estimation purposes is indicated here.

Many representations for three dimensional rotations exist.

One of them comprises quaternions.

Quaternions possess a lot of mathematical history and backgrounds. They constitute a group based on the four dimensional vector set $R^4$ with specific operator for multiplication '∘'. The sub-group $S^3$ corresponds to quaternions of unit length, and is used to represent rotations. A quaternion $q=[q_x, q_y, q_z, q_w]^T$ encodes a rotation of angle θ around a unit 3D axis μ as:

$$[q_x, q_y, q_z, q_w]^T = \left[\mu\sin\left(\frac{\theta}{2}\right), \cos\left(\frac{\theta}{2}\right)\right]^T$$

Formulas used to compute a rotation matrix R and its partial derivates based on quaternions members are well-known by the man skilled in the art. As for rotation matrices, quaternions possess more members (4) than the degree of freedom of a 3D rotation (3). When performing filtering or optimization on quaternions representing rotations, one must ensure that their length is kept unit. This is very simply done by dividing each member of the quaternion by the total norm of it, which is much simpler than the orthonormalization required by rotation matrices.

Quaternions have numerous advantages over Euler angles (see below) and direct rotation matrices when it comes to representing rotations, they offer a good balance between numerical properties and do not present artifacts. They are widely used for inertial sensor fusion.

A rotation can be represented as a 3×3 matrix R. Every column of it are of unit length and mutually orthogonal, and the determinant of the matrix is +1. This type of matrices constitutes the SO(3) (for special orthogonal) group. Each matrix belonging to this group is a 3D rotation, and any composition of matrices from this group is a rotation. This representation of a rotation is the most direct one to apply, as a 3D point $X=(x, y, z, 1)^T$ is transformed by R to a point $X_{rot}=(x_{rot}, y_{rot}, z_{rot}, 1)^T$ by a simple 4×4 matrix multiplication based on the rotation R:

$$X_{rot} = \begin{pmatrix} R & 0 \\ 0 & 1 \end{pmatrix} X$$

It must be noted that most of the other rotations representations are converted to a rotation matrix to be applied. The main drawback of the rotation matrix is the complexity of the constraints to keep the matrix in the SO(3) group when applying optimization of filtering techniques. In effect, those techniques will modify the coefficients of the matrix, but it should always be orthonormalized to belong to the SO(3) group. This is done at heavy cost and needs to be performed at each step of the algorithm where the matrix is modified.

Euler angles are the most used representation for 3D rotations. It consists in separating the rotations to a minimal 3 angle values that represent the respective rotations around the axis of the coordinates in a sequential way. They are referred to as the yaw, the pitch and the roll angles. These three values are either expressed in degrees or radians. In order to apply the transformation to a point, the Euler angles are transformed into separate rotation matrices, which are combined to form the total rotation matrix that is then applied to the point. In this disclosure, it is referred to the yaw as α, the pitch as β, and the roll as γ. A big issue in using Euler angles is the necessity to establish a convention on the order of application of the angles. In effect, one can select which angle represents a rotation around an axis, as well as the order chosen to apply them. This can create confusion and misunderstandings.

Figure 3:
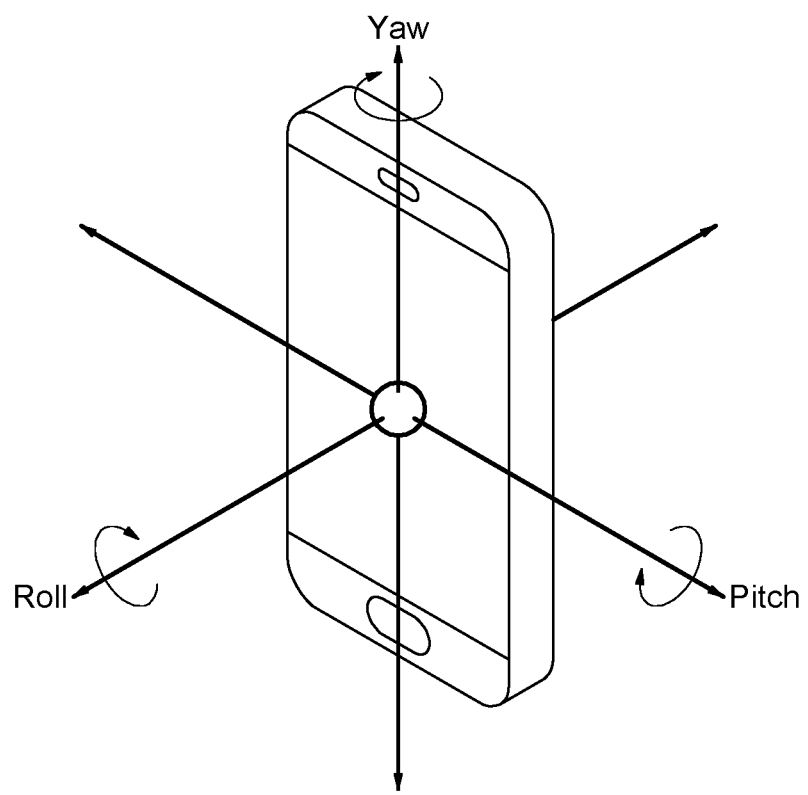
FIG. 3 illustrates a smartphone with an example of Euler angles, FIGS. 4 to 7 detail an embodiment of a method according to the disclosure.

In FIG. 3, an example of the axis displayed on a smartphone scheme is represented.

A 3D motion is a combination of a rotation and a translation $\tau=[\tau_x, \tau_y, \tau_z]^T$. As seen previously, one must always convert a rotation to a rotation matrix in order to apply it to a point. The complete motion regrouping a rotation R and a translation τ is applied to a point X by:

$$X' = \begin{pmatrix} R & \tau \\ 0 & 1 \end{pmatrix} X$$

Estimating the frame to frame camera motion in a video sequence is a highly studied problem. It is a key step in many applications: camera stabilization, rolling shutter distortions correction, encoding, tracking, image alignment for High Dynamic Range, denoising. . . .

The first step of this type of technique is generally to extract motion vectors between pairs of images. This is performed by putting in correspondences points from one frame to another.

Many factors can impact the performance of these methods. In a sequence, illumination changes can occur, modifying the pixels values from one frame to another. In-plane rotations create another dimension in the problem, which can no longer be solved as a 2D translation estimation. Motion artifacts, such as motion blur or rolling shutter distortions also intervene in the process, creating variation in terms of pixel values and localizations. Finally, scene characteristics can make a great impact on the results of those techniques: a lack of texture in the scene, low-light heavy noise, etc . . . .

A first category of algorithm makes use of pixel-wise computation. For a set of fixed given points in the first frame, a correspondence is searched in the second frame. This can be performed either for every point, which is generally called optical flow, or in a sparse manner, with techniques such as block matching or tracking.

For block-based/tracking methods, the first stage is selection of points on the first frame (with a grid pattern for instance) or every points for dense methods. Then the technique consists in finding the corresponding locations of the selected points in the second frame.

The main drawback of block-based/tracking methods for pixel motion estimation, is that every pixel does not carry the same amount of useful information. For instance, estimating the motion of a white point on a white wall is much more challenging than a black point on the same wall. If a motion needs to be estimated from two images that present changes in terms of conditions and location, it is needed to have robustness to various transformations such as illumination changes, rotation, scale. . . .

Approaches of feature extraction have been designed with the goal of finding locations in the images that carry the most information and distinctiveness. Many types of feature exist, including points, blobs, edges. . . . Points and blobs are however present in most types of sequences which makes them suitable for embedded applications. These points of interest are called keypoints.

The second category of vector generation techniques consists in extracting points of interest (keypoints) in every frame, rather than using fixed points (or every point) in the frame. Descriptors of each set of points are then computed, which consist in a higher-level, more robust information on the surrounding of the keypoint.
Correspondences are then drawn between these two set of points, in an operation known as matching.

Many feature detection methods exist.

One of these methods is based on an auto-correlation function a of a point $p=[u, v]^T$ and a shift $[\Delta u, \Delta v]^T$:

$$a(p, \Delta u, \Delta v) = \sum_{i=-N}^{i=N} \sum_{j=-N}^{j=N} (I(u+i, v+j) - I(u+\Delta u+i, v+\Delta v+j))^2$$

If this auto-correlation is small in every direction, this translates a uniform region with little interest. Only a strong value in one direction most likely indicates a contour. If every direction displays strong values however, the point is considered as being a keypoint. With a first-order Taylor approximate, the auto-correlation matrix can be expressed in function of spatial derivate of the image. The keypoint evaluation is then made with regard to the eigenvalues $\lambda_1, \lambda_2$ of that matrix. The corner-ness function is:

$$f(p)=\det(a(p))-k(\text{trace}(a(p)))^2=\lambda_1\lambda_2-k(\lambda_1+\lambda_2)^2$$

If this value at pixel p is higher than a threshold and higher than cornerness function $f$ evaluated on neighborhood points, the point is considered a corner. The threshold can be set in function of the total desired number $N_{corners}$ of corners, or an absolute quality desired. The fact that the detectors consider all directions of a gradient matrix induces its robustness to illumination changes as well as in-plane rotations.

Other methods have been designed based on the gradient matrix to detect corners.

A very light extractor in terms of computational time known by the man skilled in the art under the acronym FAST (Features from Accelerated Segment Test) has been disclosed
in Rosten, E. & Drummond, T, 2006. *Machine learning for high-speed corner detection. Lecture Notes in Computer Science (including subseries Lecture Notes in Artificial Intelligence and Lecture Notes in Bioinformatics)*, 3951 LNCS, pp. 430-443, or in
Rosten, E., Porter, R. & Drummond, T, 2010. *Faster and better: A machine learning approach to corner detection. Pattern Analysis and Machine Intelligence, IEEE Transactions on*, pp. 1-35.

FAST is an algorithm to extract keypoints designed to be the lightest possible strategy, sparing computational resources for other tasks. It is a corner detector based on the Bresenham circle of radius 3 around a point p, which is simply the "pixelized" version of a circle. This circle contains 16 points, if a certain amount $N_{radius}$ of contiguous points' intensities are all either lower or brighter than the point p (plus/minus a threshold $\tau$), the point p is considered a corner.

It has been shown that using the $N_{radius}=9$ (9 contiguous points are used to detect a corner) was a very good choice compared to other values, such as $N_{radius}=12$.

The global movement between two successive video images may be estimated via a RANSAC algorithm.

The RANSAC algorithm is an iterative procedure that finds, among a set of proposed models, the one with the largest consensus, meaning the model that accounts for pieces of data with an error inferior to a threshold T.

This model is computed with a confidence $\eta$, a parameter that has to be set by the user.

The key of the method is to explicitly integrate the proportion of good pieces of data, or the inlier percentage $\epsilon$, in order to determine the number of iterations needed to reach a confidence level of $\eta$ that the best model found is indeed the correct one. As it is applied in the context to motion estimation, the following notation may be used:

the input data is a set of N motion vectors $v(i)=(X_i^{prev}, X_i^{curr})$, where $X_i^{prev}$ is the point on the previous frame and $X_i^{curr}$ the point on the current frame and h is a 2D motion model in the form of a 3×3 matrix as shown above The first stage of the procedure is to compute a model $h_0$ with a minimal amount m of randomly selected motion vectors v(i) for the desired model type. For instance, a similarity transformation that incorporates in-plane rotation, scaling and translation requires 3 motion vectors.

In a second step, the created motion model is tested with all pieces of data available. For each motion vectors the reprojection error is computed applying the proposed model to the previous points:

$$\in(h_0,v(i))=\|h_0 X_i^{prev}-X_i^{curr}\|$$

If $\in(h_0, v(i))$ is below the threshold T, the vector v(i) is considered an inlier with respect to model $h_0$, otherwise it is an outlier for this model.

Thirdly, the total number of inliers $k_0$ leads to the inlier percentage for this model: $\varepsilon_0=k_0/N$.

This allows to calculate the remaining number of iterations. In effect, with this estimated percentage of inlier, the probability to create a model with inliers only is $\varepsilon_0^m$. If the procedure is iterated K times, the probability that not a single model was created with inliers only is: $(1-\varepsilon_0^m)^K$. As the desired confidence is $\eta$, the probability $(1-\varepsilon_0^m)^K$ needs to be equal to $(1-\eta)$:

$$(1-\varepsilon_0^m)^K=(1-\eta)$$

As we look for the number of iterations that should be produced:

$$K \geq \frac{\log(1-\eta)}{\log(1-\varepsilon_0^m)}$$

Fourthly, steps a) and b) are repeated K times, or until a better model $h_j$ is found, in the sense that it displays a higher inlier percentage. If this occurs, then K is recomputed with the new inlier percentage, which leads to a lower amount of remaining iterations.

Finally, when the number K of iterations has been reached, the best model is considered to be the one with the highest support, which corresponds to the highest inlier percentage. In most implementations, K is bounded so that the procedure does not produce too much computations. In some implementations, the best model $h_{best}$ is recomputed with a least-square approach with all its inliers.

This procedure is "memory-less" in the sense that, for each iteration, the new model under testing is not dependent with the previous ones, only the amount of iterations relies on what was computed before. Other techniques, such as Least-Median-of-Square (LMedS) proceed similarly, but differ in considering the median error of a model $h_j$ as the criteria of performance of a model, rather than its inlier percentage $\varepsilon_j$.

The main advantage of the RANSAC strategy is that it can extract a motion model without restriction on the amount/type of noise. It does not require massive parameterization, as only T and $\eta$ have to be set. Thanks to the lack of dependency between two iterations, it is very prone to parallel implementation. However, this procedure cost can vary a lot, as it relies on the quality and quantity of the dataset.

However the RANSAC technique has a very variable computational time that scales linearly with the amount of data and also relies heavily on the dataset quality, by the rate of inliers. To avoid those drawbacks, the RANSAC technique was adapted in a preemptive procedure. An overview of the preemptive RANSAC algorithm is the following one:

−1 Generate M motion models $h_j$, by selecting randomly a minimal number of vectors v(i) to create each model. Initialize a score $S_j=0$ for each model. Set the increment step i=1

−2 For every model $h_j$, compute the reprojection error $\in(h(j),v(i))$ on the set of vectors. If it is below the predefined threshold T for the model $h_j$, then update its score: $S_j=S_j+1$ −3 Only keep the best $f(i)$ models (sorting by score), where $f(\ )$ is a preemption function.

−4 If $f(i) \leq 1$ (only one model left) or i=N (we have tested every motion vectors), keep the model with the highest score as the global estimation. Otherwise, set i=i+1 and go to step 2.

The preemption function $f(i)$ defines the number of models kept at each stage of the algorithm. For instance, the one used is:

$$f(i)=\lfloor M2^{-\lfloor i/B \rfloor} \rfloor$$

where B is a bundle size of motion vectors, and $\lfloor . \rfloor$ denotes the downward truncation function.

In this example, the number of models considered after each bundle of B motion vectors is just divided by two.

However, although the Preemptive RANSAC algorithm has certain advantages notably in terms of calculation time, which makes it particularly well suited for embedded applications, and also for parallel processing, movement estimation is less flexible and sometimes not really suitable for extreme cases. Thus, for example, if a person or an object moves in an image field, it may happen that the movement estimator is focused on the person, producing a result that does not match the movement of the camera, which could, for example, provide incorrect video stabilization.

An improvement has been disclosed in FR patent application number 1459675 (U.S. patent application Ser. No. 14/848,962) enabling the quality of the image sequence to be improved, and in particular, in certain specific situations. Such an improvement is called Hybrid Ransac and uses information originating from at least one inertial sensor, e.g., at least one gyroscope, in combination with the visual information for improving the estimation of the movement between two successive images.

The hybrid preemptive RANSAC algorithm with all the steps involved, can be summarized as follows:

−1 Generate M−1 motion models $h_j$, by selecting randomly a minimal number of vectors to create each model. Create the last model using only inertial measurements −2 Compute the distance between the visual and inertial models $\partial$ ($h_j$, I(t)) for each model −3 Using the median value $\partial_{med}$, compute $\lambda_{dyn}$ −4 Initialize the hybrid score for each model $S_{hyb}(j)=-N\lambda_{dyn}(1-e^{-\partial(h_j,I(t))})$. Set the increment step i=1

−5 Compute the reprojection error $\in(h_j, v(i))$ for every model h(j). If it is below T, then update the score of the model $h_j$ as: $S_j^{hyb}=S_j^{hyb}+1$ −6 Only keep the best $f(i)$ models (sorting by score), where $f(\ )$ is a preemption function.

−7 If $f(i) \leq 1$ or i=N, keep the model with the highest score as the global estimation. Otherwise, set i=i+1 and go to step 5.

Adaptation of the hybrid RANSAC algorithm to estimate 3D rotation is now described The inertial data are modeled as Euler angles Inert(t)=$\alpha_t$, $\beta_t$, $\gamma_t$ as the relative yaw, pitch and roll differences that occurred between frame t−1 and frame t. The visual measurement are the 3D/2D correspondences between the 3D map modeled in the SLAM and the current 2D frame with its extracted features. The motion models h(j) could be taken as rotation matrices, but it would lead to a high complexity both in model generation and in error computation $\in(h(j), v(i))$, since it is needed to project exactly every point and then compute its reprojection error.

To avoid these costs, it is advantageous to model the rotation representations as Euler angles $h(j)=(\omega_x,\omega_y,\omega_z)$. This will lead to approximations that are acceptable when dealing with small angles. Measurements are first taken as couples $(X_k,p_i)$, with $X_k=(x_k,y_k,z_k,w_k)^T$ a 3D point in homogenous coordinates, and $p_i=(u_i,v_i,w_i)$ a 2D point of the current frame. Those measurements are converted to motion vectors, to make the motion model generation less expensive.

K is the 3×3 intrinsic parameters matrix of the camera. P is the estimated 3×4 projection matrix from the previous frame. For each measurement, the 3D point is projected into the previously estimated camera pose according to:

$$p_k^{proj}=K*P*X_k$$

Measurements v(i) are now couples $(p_k^{proj},p_i)$. $du_i$ is the horizontal component of the motion vector:

$$du_i = \frac{u_k^{proj}}{w_k^{proj}} - \frac{u_i}{w_i}$$

With similar computations, $dv_i$ is calculated as the vertical component of the motion vector. We now need to generate the motion models h(j), with a minimal number of visual measurements v(i). While an exact computation of the rotation would require fairly complex methods, an approximation of it can be performed rapidly with two measurements v(i) and v(i'), as one is not enough to compute the three rotations. The average motion is interpreted as the rotation in both directions. We compute yaw (with a similar technique for pitch $\omega_y$) as:

$$\omega_x=(du_i+du_{i'})/2\rho_x$$

Where $\rho_x$, $\rho_y$ are the respective scaling factors to convert yaw into horizontal translation and pitch into vertical translation in the 2D frame. Computation are solely based on focal length of the camera and resolution of the image. Roll is calculated with a difference of angles in polar coordinates:

$$\omega_z=a\tan 2(dv_i,du_{i'})-a\tan 2(dv_i,du_i)$$

In a preemptive RANSAC procedure, considering an inlier rate $\tau_{inlier}$, the probability to generate a model without outlier is $(\tau_{inlier})^m$, m being the number of measurement used to create a model. In the present approach, m=2, inducing a high probability to generate an outlier-free model. This is highly beneficial compared to other rotational models that need a much higher m. δ(h(j), Inert(t)) is simply the L2-norm between the two Euler angle representations. The error function ∈(h(j), v(i)) is chosen as the reprojection error.

When estimating the movement of the apparatus, for example 3D rotation, a 3D change in position can be seen as noise.

In RANSAC type algorithm, for example an hybrid RANSAC algorithm, the noise is modeled the same way for each point (the threshold is the same for each point).

However the noise is non-uniform in the whole image reducing thus the precision in the motion estimation.

A novel variable constraint with respect to the depth of the 3D point observed $Dep(X_p)$ is thus added in the algorithm. Indeed, the closer a point, the more sensitive it is to translation motions that are here considered as noise, as it is only desired to estimate rotation.

Therefore there is a variable threshold $T_i$ for each measurement which can be determined by using a fixed threshold T and a correction term $\Delta T_i$.

After those general considerations on the disclosure, particular embodiments thereof will be now detailed with reference to FIGS. 3 to 7.

As indicated above, when estimating the movement of the apparatus, for example 3D rotation, a 3D change in position can be seen as noise.

In RANSAC type algorithm, for example an hybrid RANSAC algorithm, the noise is modeled the same way for each point (the threshold is the same for each point).

However the noise is non-uniform in the whole image reducing thus the precision in the motion estimation.

Figure 4:
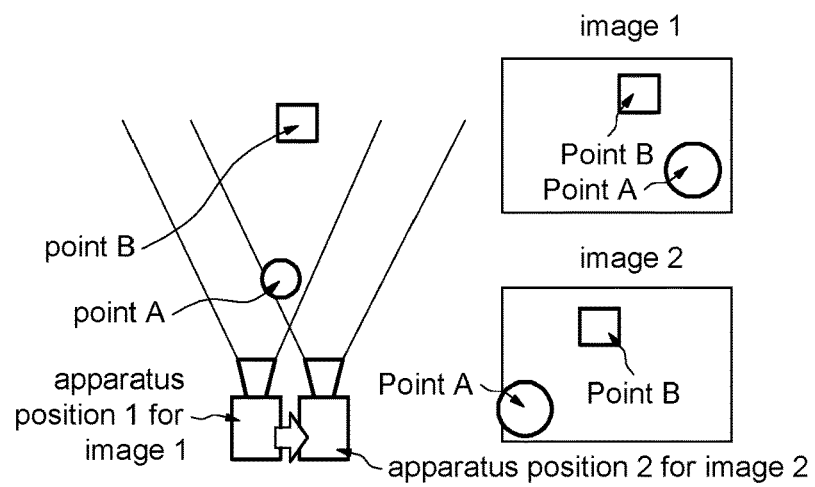

As a matter of fact as illustrated in FIG. 4, two points in A and B in the first image have different depths. Those points A and B have also different depths in the second image after a motion, here a translation, of the apparatus (camera) between the first position and the second position.

Thus the displacement of point A between the first image and the second image is greater than displacement of point B between the first image and the second image because the depth of point A is different from the depth of point B in the first image.

Thus an adaptation of the threshold is advantageously made in the type RANSAC algorithm and each point has its own threshold.

A particular embodiment of a method for determining a movement of an apparatus between each current pair of first and second successive video images captured by said apparatus, is now detailed with reference to FIGS. 5 to 7 in particular.

Figure 5:
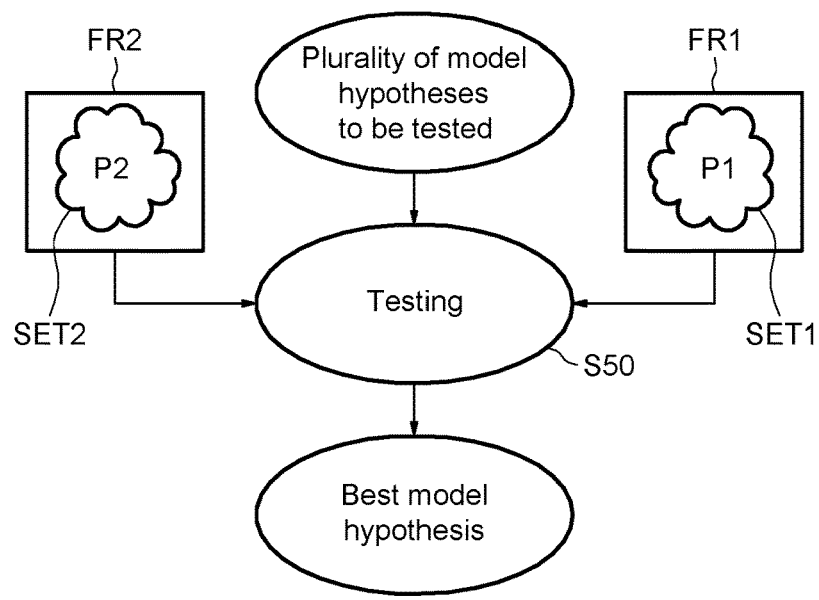

As illustrated on FIG. 5, said method includes a phase S50 of testing a plurality of model hypotheses of said movement by a deterministic algorithm.

Said deterministic algorithm may be a RANSAC type algorithm (either a conventional or a preemptive or an hybrid RANSAC).

Other type of deterministic algorithm may be used for example Least Square algorithms, M-estimators, Least Median Square algorithms, Non linear Regression algorithms.

Although said movement of the apparatus between the two images may be any movement, in particular a movement in a plane, said movement is advantageously here an eventual orientation modification of said apparatus between the first image and the second image (i.e., an eventual 3D rotation of said apparatus between the first image FR1 and the second image FR2).

Each model hypothesis may thus comprise Euler angles.

Each model hypothesis is for example obtained from motion vectors by using for example block-based/tracking methods or preferably keypoints extraction methods.

Said phase of testing S50 operates on a set SET1 of first points P1 in the first image FR1 and a set SET2 of first assumed corresponding points P2 in the second image FR2 so as to deliver the best model hypothesis.

This best model hypothesis defines the movement of the apparatus between the first image and the second image.

The set SET1 of first points P1 may include all the image points or preferably only some of those points, for example keypoints (or points of interest).

Those keypoints may be determined by using for example the above mentioned FAST algorithm.

Figure 6:
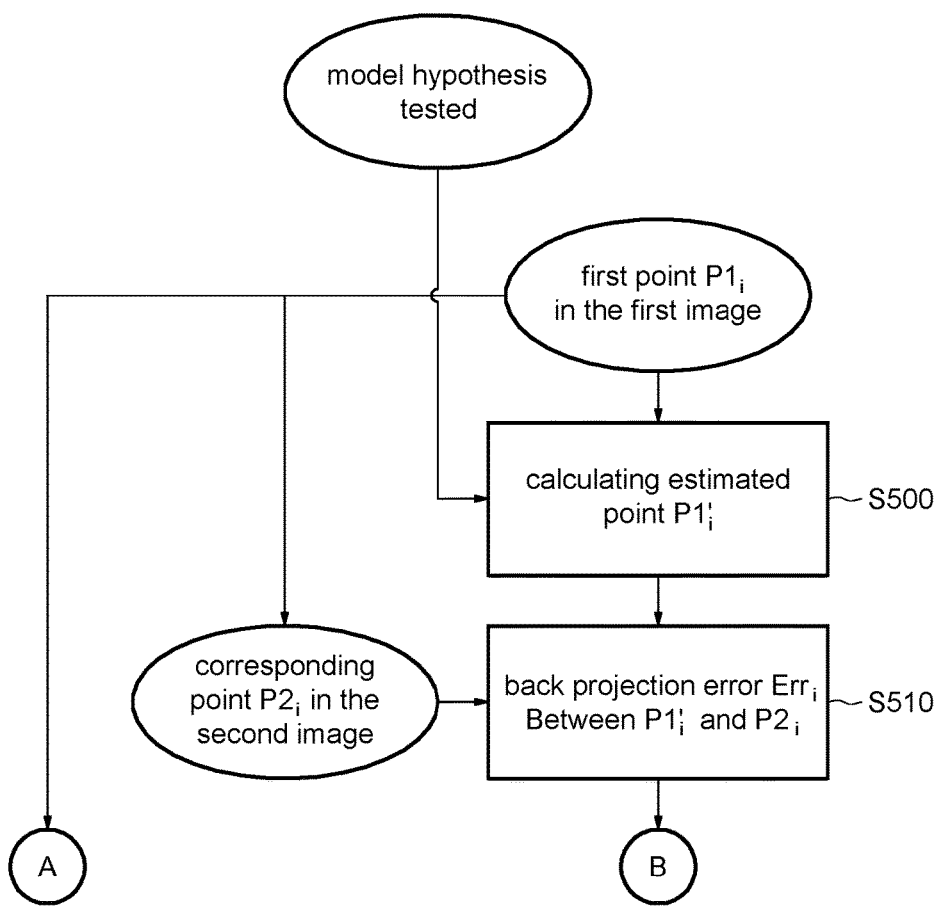
Figure 7:
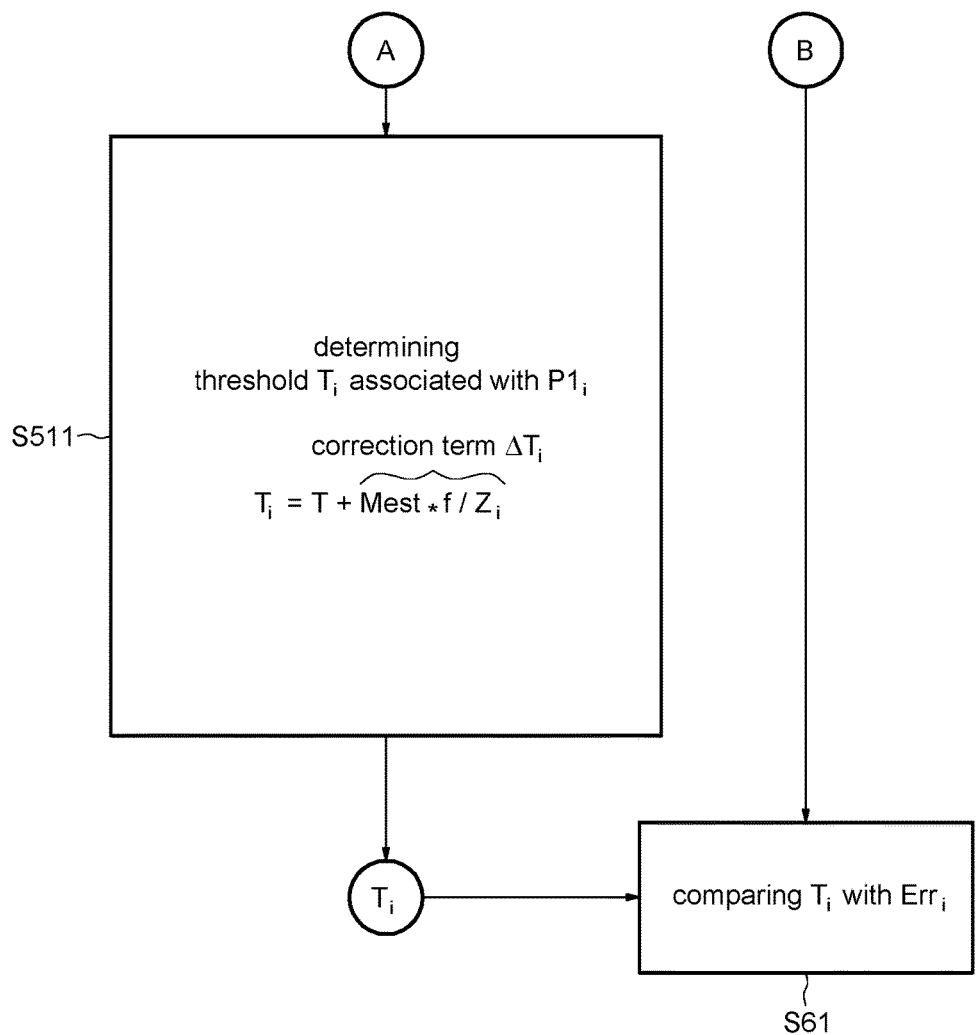

As illustrated on FIGS. 6 and 7, said phase of testing comprises for each first point $P1_i$ in the first image, calculating (S500) a corresponding estimated point $P1_i'$ using the tested model hypothesis, determining (S510) the back-projection (or reprojection) error $Err_i$ between said estimated point $P1_i'$ and the assumed corresponding point $P2_i$ in the second image, and comparing (S61) each back projection error $Err_i$ with a threshold $T_i$.

Points not following the model, i.e., of which the back-projection error is greater than the threshold, are called outliers.

As illustrated in step S511 of FIG. 7, the threshold $T_i$ associated with the first point $P1_i$ is determined by using a fixed threshold T and a correction term $\Delta T_i$.

The threshold $T_i$ is for example the sum of the fixed threshold T and said corresponding correction term $\Delta T_i$.

The correction term $\Delta T_i$ takes into account an estimation of the depth $Z_i$ of said first point in said first image and an estimation Mest of the spatial movement of the apparatus between the first and the second images.

More precisely the correction term $\Delta T_i$ is equal to Mest.f/$Z_i$, where f is focal length of the apparatus (camera for example).

Mest is the expected distance of the apparatus during its movement.

The depth $Z_i$ may be estimated or obtained for example by a depth sensor (for example a Time-Of-Flight sensor, a stereo camera, infrared sensors, . . . ) included in the apparatus or by a 3D cartography of the image obtained for example by a SLAM (Simultaneous Localization And Mapping) type algorithm.

Simultaneous Localization And Mapping (SLAM) type algorithm is well known by the man skilled in the art and consists in estimating the 3D motion of a platform in an environment (also known as ego-motion) and mapping its surrounding scene at the same time. Cameras and inertial sensors can be fused in order to perform an accurate and robust estimation, using the characteristics of each sensor.

The estimation of the spatial movement between the two images may be obtained by a RANSAC type algorithm, or preferably by a filter, for example a particle filter, in particular when the movement is a translational movement.

Particle filtering is widely used in many domains of computer vision, from tracking to odometry. Also known as sequential Monte-Carlo estimation, it is a density estimator that utilizes a sampling strategy to represent the posterior density of the state probability [see for example Lui, J. S. & Chen, R., 1998. Sequential Monte Carlo Methods for Dynamic Systems. *Journal of the American Statistical Association*, 93(443), pp. 1032-1044, incorporated by reference in the present patent application].

The approach proposed here is based on the particle swarm technique well known by the man skilled in the art.

More precisely, Based on the 3D/2D visual measurements v(i), now supposedly outlier free with the hybrid RANSAC procedure, an estimation of the camera position and velocity is performed. The estimated 3D position at frame t is noted $\hat{D}_t$, the estimated velocity is noted $\hat{V}_t$. Each particle (which is a virtual camera) $\xi_i^t$ has its own position $d_i^t$ and velocity $v_i^t$. The algorithm consists in two steps. First, we perform propagation:

$$d_i^t = d_i^{t-1} + v_i^{t-1}$$

The probability of each particle with respect to the measurements $\pi(\xi_i|v(1, \ldots, N))$ is then computed. In order to estimate these probabilities, the previously calculated rotation is used $h(j_{best})$. The Euler angles are converted to an axis $k_{best}$ and angle $\theta_{best}$ representation. Then the Rodrigues formula is used in order to obtain the corresponding rotation matrix:

$$R_{best} = I + K_{best} \sin \theta_{best} + K_{best}^2 (1 - \cos \theta_{best})$$

With $K_{best}$ being the cross-product matrix of the vector $k_{best}$. A projection matrix $P_l$ is therefore generated for every particle: $P_l = [R_{best}|d_l]$. Inlier measurements points are projected into the frame for every particle, with projection matrices $P_l$. The reprojection error of measurement v(i) for particle $\xi_i^t$ is noted $\varepsilon_i^l$. $\pi(\xi_i^t|v(1, \ldots, N))$ is computed as:

$$\pi(\xi_i^t | v(1, \ldots, N)) = 1 \bigg/ \sum_i \varepsilon_i^l$$

The estimated position and velocity are calculated as the probabilistic-weighted average of the particles.

$$\hat{D}_t = \sum_l \frac{\pi(\xi_i^t | v(1, \ldots, N))}{\pi_{tot}} d_i^t$$

With $\pi_{tot} = \Sigma_i \pi(\xi_i^t|v(1, \ldots, N))$. The particle with highest probability $\xi_{best}^t$, is now used to compute the velocity of each particle.

Figure 8:
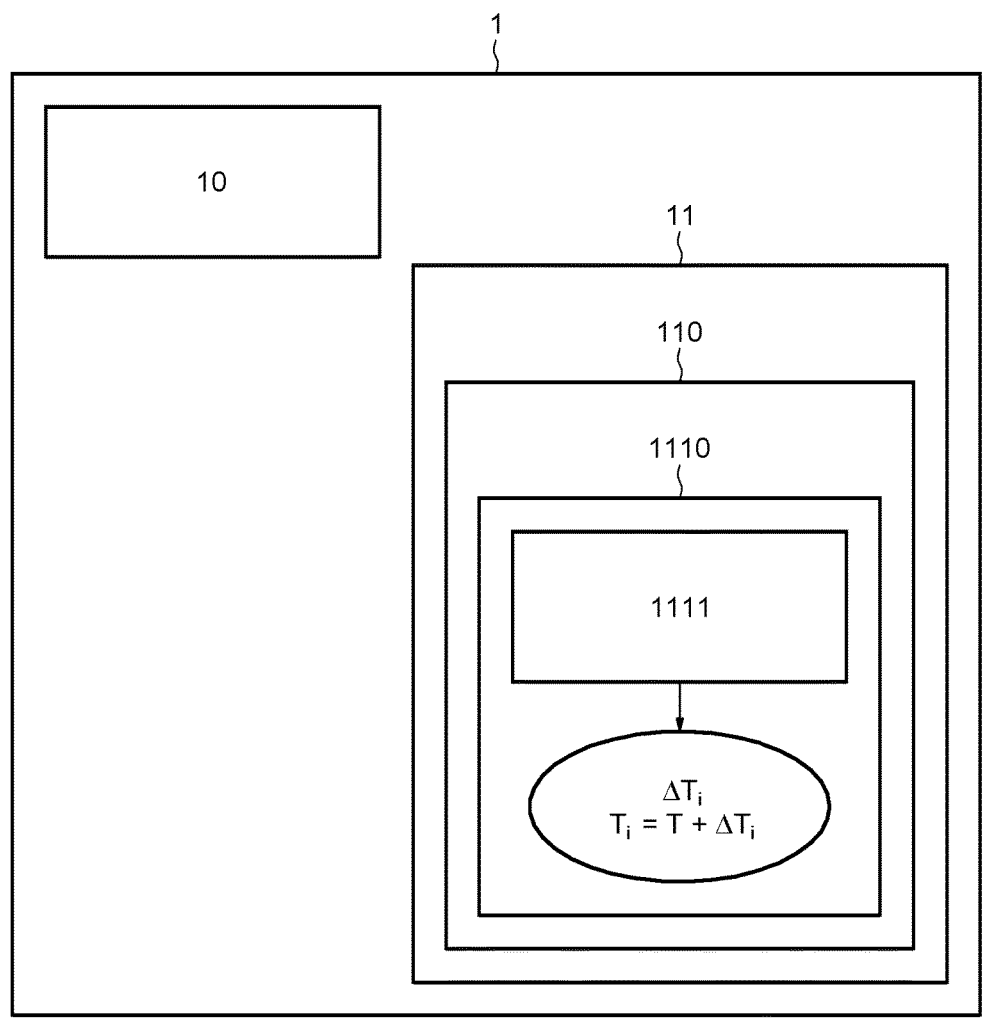
FIG. 8 illustrates schematically an embodiment of a device and of a platform according to the disclosure.

We refer now more particularly to FIG. 8, which illustrates diagrammatically an embodiment of a platform 1, for example a smartphone or a tablet according to the disclosure including a device 11 according to the disclosure and an apparatus 10, like an image sensor 10, as for example a camera.

The device 11 for determining a movement of an apparatus between each current pair of first and second successive video images captured by said apparatus 10, includes testing means 110 configured to perform a phase of testing a plurality of model hypotheses of said movement by a deterministic algorithm, for example a RANSAC type algorithm, operating on the set SET1 of first points in the first image and the set SET2 of first assumed corresponding points in the second image so as to deliver the best model hypothesis.

The testing means 110 comprises processing means 1110 configured for each first point $P1_i$, to calculate a corresponding estimated point $P1'_i$ using the tested model hypothesis, to determine the back-projection error between said estimated point and the assumed corresponding point in the second image, and to compare each back projection error with the threshold $T_i$.

Said processing means 1110 comprises calculation means 1111 configured for each first point of the first image, to determine the correction term taking into account the depth of said first point in said first image and the spatial movement of the apparatus between the first and the second images, and to determine the threshold associated with said first point by using said correction term.

The testing means, the processing means and the calculation means may be realized for example by a microprocessor executing respective software modules stored on a nontransitory computer readable medium.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a memory;
processing circuitry coupled to the memory, wherein the processing circuitry, in operation:
tests a plurality of model hypotheses of movement of an imaging device between capturing successive first and second video images using a deterministic algorithm operating on a first set of points in the first video image and second points in the second video image, the testing including, for each point of the first set of points and for each model hypothesis, calculating a corresponding estimated point using the model hypothesis, determining a back-projection error between said estimated point and a corresponding point of the second points in the second video image, and comparing each back projection error with a threshold associated with the first point, wherein for each first point of the first video image, a correction term is determined based on a depth of said first point in said first video image and an estimated movement of the imaging device between capturing the first and the second video images, and the threshold associated with said first point is determined by using said correction term;
selects a model hypothesis of the plurality of model hypotheses based on the testing; and
determines a movement of the imaging device between capturing the successive first and second video images using the selected model hypothesis.

2. The device of claim 1 wherein said movement is an orientation modification of said imaging device between capturing the first video image and the second video image.

3. The device according to claim 2 wherein each model hypothesis comprises Euler angles.

4. The device according to claim 1 wherein each model hypothesis is obtained from motion vectors.

5. The device according to claim 1 wherein said movement between capturing the first and second video images comprises a translational movement of the imaging device.

6. The device according to claim 1 wherein, for each first point, the threshold associated with the first point is a sum of a fixed threshold and said correction term for the first point.

7. An apparatus, comprising:
an imaging device, which, in operation, captures successive first and second video images; and
processing circuitry coupled to the imaging device, wherein the processing circuitry, in operation:
tests a plurality of model hypotheses of movement of an imaging device between capturing successive first and second video images using a deterministic algorithm operating on a first set of points in the first video image and second points in the second video image, the testing including, for each point of the first set of points and for each model hypothesis, calculating a corresponding estimated point using the model hypothesis, determining a back-projection error between said estimated point and a corresponding point of the second points in the second video image, and comparing each back projection error with a threshold associated with the first point, wherein for each first point of the first video image, a correction term is determined based on a depth of said first point in said first video image and an estimated movement of the imaging device between capturing the first and the second video images, and the threshold associated with said first point is determined by using said correction term;
selects a model hypothesis of the plurality of model hypotheses based on the testing; and
determines a movement of the imaging device between capturing the successive first and second video images using the selected model hypothesis.

8. The apparatus according to claim 7, comprising telecommunication circuitry.

9. The apparatus according to claim 7 wherein, for each first point, the threshold associated with the first point is a sum of a fixed threshold and said correction term for the first point.

10. A apparatus, comprising:
a memory;
processing circuitry coupled to the memory, wherein the processing circuitry, in operation:
tests a plurality of model hypotheses of movement of an imaging device between capturing successive first and second video images, the testing including, for each point of a first set of points of the first video image and for each model hypothesis, calculating a corresponding estimated point using the model hypothesis, determining a back-projection error between said estimated point and a corresponding point of points in the second video image, and comparing each back projection error with a threshold associated with the first point, wherein for each point of the first set of points of the first video image, a correction term is determined based on a depth of said first point in said first video image and an estimated movement of the imaging device between capturing the first and the second video images, and the threshold associated with said first point is determined based on said correction term;
selects a model hypothesis of the plurality of model hypotheses based on the testing; and
determines a movement of the imaging device between capturing the successive first and second video images using the selected model hypothesis.

11. The apparatus of claim 10 wherein said movement is an orientation modification of said imaging device between capturing the first video image and the second video image.

12. The apparatus according to claim 11 wherein each model hypothesis comprises Euler angles.

13. The apparatus according to claim 10 wherein each model hypothesis is obtained from motion vectors.

14. The apparatus according to claim 10 wherein said movement between capturing the first and second video images comprises a translational movement of the imaging device.

15. The apparatus according to claim 10 wherein, for each first point, the threshold associated with the first point is a sum of a fixed threshold and said correction term for the first point.

16. The apparatus of claim 10 comprising the imaging device.

* * * * *